United States Patent Office 3,240,619
Patented Mar. 15, 1966

3,240,619
METHOD OF COATING WITH POLYESTER RESINS
Charles M. Winchester, Cincinnati, Ohio, assignor to Interchemical Corporation, New York, N.Y., a corporation of Ohio
No Drawing. Filed June 21, 1960, Ser. No. 37,578
6 Claims. (Cl. 117—38)

The present invention relates to a method of coating surfaces; more particularly the invention relates to a method of applying protective and decorative surface coatings wherein the coatings are comprised of in situ formed unsaturated polyester-vinyl monomer copolymerization products.

The use of unsaturated polyester resin-vinyl monomer reaction products as surface coatings offers several outstanding features to the coatings field. Such coatings, formed by the copolymerization, or interpolymerization, of unsaturated polyester resins with vinyl monomers, have excellent resistance to chemicals, solvents, light and weathering; also they have good abrasion resistance and cold check resistance. An additional advantage is that these coatings can be applied at or near 100% non-volatile content.

Notwithstanding the numerous advantages of polyester resins as coatings they still have the major disadvantage of being too unstable to achieve extensive usage as coating materials. Conventional polyester resin-vinyl monomer formulations must be catalyzed before they will cure, or copolymerize; the catalysts conventionally employed are the organic peroxides, preferably together with an activator, or promoter, to speed up the copolymerization reaction at low temperatures. The "pot life" of such polyester resin-vinyl monomer compositions containing peroxide catalysts and promoter is usually no more than a few minutes to several hours. Such instability obviously does not allow conventional polyester resin-vinyl monomer systems to be extensively used in the protective and decorative coatings field. A major object of the present invention is to completely overcome this disadvantage of polyester resins as coatings. Other objects of the invention will become apparent from the following detailed description of the invention.

The objects of the invention are accomplished by applying the polyester resin-vinyl monomer coating as two separately applied coatings, one coating containing the peroxide catalyst and the other coating the activator, each coating performing a separate and unique function in the film system, e.g., one coating a primer, the other a topcoat. Either of the separately applied coatings can contain a colorant or, if a design is desired, it can advantageously be applied by printing onto a colored basecoat prior to applying a clear topcoat. When the coatings come together there is sufficient rapid migration of promoter and catalyst from one layer of the coating to the other to form free radicals which initiate rapid polymerization near the layer interface. Once started the polymerization is propagated quickly throughout both coatings, and the separate film layers are bound together.

One great advantage of the method of the invention is that a factory equipped with conventional coating equipment, such as spray guns, curtain coaters, roller-coaters, etc., can employ the invention without having to install special two-stream equipment such as double-head spray guns or double-head curtain coaters that are usually recommended for the application of polyester coatings to overcome the problem of short "pot life." Such special equipment applies two streams of material simultaneously, one containing polyester with activator, and the other polyester with catalyst, or a catalyst solution alone. This special equipment is costly and complicated to operate requiring careful metering of the two streams to constantly maintain a fixed ratio.

Sometimes the use of special equipment is avoided by adding the peroxide catalyst to a vinyl polymer or nitrocellulose lacquer undercoat which is thoroughly dried before applying the polyester containing activator with conventional equipment. In this case the catalyst migrates into the polyester topcoat and triggers polymerization of the polyester. No polymerization occurs in the lacquer undercoat, however, and the cohesive bond between the polyester and the undercoat is usually weak. One great advantage of the present invention is that the undercoat or basecoat contains both catalyst and polyester resin-vinyl monomer so that both basecoat and topcoat polymerize simultaneously and together forming a strong cohesive bond between coatings. Also, when the preferred basecoat formulations are employed the interval between application of coats is reduced from hours to minutes.

My invention relates to the use of conventional copolymerizable linear polyesters in general. These include polyesters prepared by reacting a glycol such as ethylene glycol, propylene glycol, diethylene glycol and triethylene glycol with an $\alpha,\beta$-unsaturated aliphatic dibasic acid or anhydride such as maleic anhydride, fumaric acid, citraconic acid, mesaconic acid, itaconic acid and aconitic acid. Such polyesters are widely known and have been described in numerous patents. As described in these patents, e.g., U.S. Patent No. 2,255,313 these copolymerizable linear polyesters may be modified by including desirable amounts of other reactants such as a saturated dibasic acid to increase flexibility of the final product and polyhydric compounds such as glycerol to provide a minor amount of cross-linking and thus build up the viscosity of the resin.

The vinyl monomer component may be an ethylenically unsaturated aromatic monomer such as styrene and vinyl toluene, or it may be a non-conjugated ethylenically aliphatic unsaturated monomer such as methyl methacrylate, methyl acrylate, and other unsaturated esters and ethers. In general, the conventional type of monomer can be used, i.e., monomers containing a non-conjugated $>C=CH_2$ group, and more than one monomer may be present in a given film system. As is conventional in the art our coating composition will usually contain a small amount of a gelation inhibitor to inhibit premature gelation, or copolymerization, of the monomer with the polyester resin. These inhibitors are well known in the art and include phenols containing two or more hydroxyl groups, e.g., hydroquinone, catechol and tertiary butyl catechol. Usually the inhibitor comprises no more than a small fraction of one percent of the composition.

Suitable peroxide catalysts are those that are conventionally used for catalyzing the copolymerization of vinyl monomers with unsaturated copolymerizable polyester resins. Typical ones include methyl ethyl ketone peroxide, benzoyl peroxide, lauryl peroxide, cyclohexyl peroxide, tertiary butyl hydroperoxide, and the like. The amount of catalyst required is usually no more than about 0.01 to 5.0% by weight of peroxide based on the total composition with the amount 0.5 to 2.0% preferred.

The peroxide catalysts will be used in conjunction with conventional promoters by employing the catalyst in one coating and the promoter in the other. These promoters, or modifiers or accelerators, as they are sometimes referred to, are well known in the art.

Typical promoters are cobalt naphthenate, tertiary aromatic amines such as dimethyl aniline. The function of promoter is to speed up the curing of the resin composition, especially at low temperatures. Since activators usually add color to the system it is preferred that they be added to the basecoat.

As is conventional in the coatings field the polyester coating composition may contain additional ingredients to impart desirable properties to the coatings. For instance flatting agents may be added, especially in the topcoat, to reduce gloss. In case the polyester used is one whose cure is inhibited by oxygen of the air a small amount of wax can be included in the coating composition, especially the topcoat; this is conventional practice in the art and various waxes are used. The preferred waxes for the present invention are the hydrocarbon waxes, with melting points in the range 120–150° F., and amounts of usually 0.05 to 3.00 percent by weight.

It will usually be preferable to use a basecoat that contains a relatively high degree of pigmentation. The high level of pigmentation is usually necessary to give a basecoat that will dry rapidly to a substantially tack-free state so that the basecoat will be firm enough to print with an ink and/or topcoat with another polyester coating. Although such high pigmentation is not necessary for the practice of the invention it is very desirable in that it allows the invention to be used in the rapid finishing schedules that are encountered in industry.

The following examples in which the parts are by weight are given to further illustrate the invention.

*Example 1*

A base paste for a basecoat composition was prepared by dispersing—

| | Parts |
|---|---|
| Titanium dioxide pigment | 50.0 |
| Talc (e.g. Mistron MS C) | 8.7 |
| Bentone 34 (dimethyl dioctyl ammonium bentonite) | 1.0 | into a solution of

| | |
|---|---|
| Polyester resin solution | 24.4 |
| Styrene | 15.9 | on a roller mill. The polyester resin solution was prepared by esterifying 28.95 parts propylene glycol in the presence of a trace of hydroquinone, with 24.28 parts phthalic anhydride and 21.04 parts fumaric acid, to acid number of 30 to 35 then adding 0.03 part of stabilizer solution (one-third p-tertiary butyl catechol and two-thirds styrene) and 25.70 parts styrene.

The base paste was let down as follows:

| | Parts |
|---|---|
| Base paste | 77.2 |
| Toluene | 15.7 |
| Acetone | 6.6 |
| N,N-dimethyl p-toluidine | 0.5 | to give a composition having a viscosity of 20 seconds (#4 Ford Cup) and suitable for spray application. The composition was sprayed on composition wallboard at a wet film thickness of about 1.0–1.5 mils and then flash dried about one minute at room temperature. The basecoat was then printed with a wood grain design with a conventional offset gravure printing ink containing 0.5 percent N,N-dimethyl p-toluidine. A typical printing ink would be as follows:

| | Parts |
|---|---|
| Blanc Fixe base paste | 63.0 |
| Lamp black toning paste | 2.1 |
| Burnt umber toning paste | 3.5 |
| Butyl Cellosolve solvent | 31.4 |

The Blanc Fixe base paste consists of the following:

| | Parts |
|---|---|
| Blanc Fixe pigment | 54.0 |
| Vehicle | 44.0 |
| Bentone 34 | 2.0 |

The lamp black toning paste consists of the following:

| | Parts |
|---|---|
| Lamp black pigment | 25.00 |
| Vehicle | 68.75 |
| Butyl Cellosolve | 6.25 |

The burnt umber toning paste consists of the following:

| | Parts |
|---|---|
| Burnt umber pigment | 45.0 |
| Vehicle | 45.0 |
| Butyl Cellosolve | 9.5 |
| Bentone 34 | .5 |

The vehicle in all the above paste formulas is as follows:

| | Parts |
|---|---|
| Soya fatty acid | 17.04 |
| Phthalic anhydride | 22.23 |
| Benzoic acid | 8.47 |
| Glycerine | 14.41 |
| Butyl Cellosolve | 37.85 |

A base paste for a topcoat composition was prepared by dispersing:

| | Parts |
|---|---|
| Flat #130 (spray-dried urea resin) | 20.00 |
| Cab-O-Sil H5 (colloidal silica) | 5.00 | into a solution of

| | |
|---|---|
| Polyester resin solution (same as in ground coat) | 65.00 |
| Styrene | 10.00 | on a roller mill. This base paste was let down as follows:

| | Parts |
|---|---|
| Base paste | 20.20 |
| Polyester resin solution | 44.38 |
| Stabilizer solution (same as in ground coat) | 0.02 |
| Wax solution (2% solution of refined paraffin wax M.P. 124° F., in styrene) | 5.00 |
| Styrene | 26.40 |
| Catalyst paste (50% benzoyl peroxide, 50% tricresyl phosphate) | 4.00 | to give a topcoat composition suitable for spray application. This topcoat composition was sprayed over the wet inked design and then the composite coating was allowed to cure at room temperature. It was tack free within 3 to 5 minutes, fairly hard after an hour, and very hard and mar resistant after an overnight cure at room temperature.

*Example 2*

An unsaturated polyester was prepared by esterifying a mixture of 27.73 parts of diethylene glycol and 4.07 parts of ethylene glycol in the presence of a trace of hydroquinone and 0.07 part of triphenyl phosphite with 19.71 parts fumaric acid and 21.06 parts of isophthalic acid. Triphenyl phosphite is a stabilizer to improve shelf life. The resulting polyester resin, having an acid number of 6–10, was diluted with 27.31 parts of styrene and 0.05 part of stabilizer solution consisting of one-third p-tertiary butyl catechol and two-thirds styrene, and was used in compounding a white basecoat composition as follows:

| | Parts |
|---|---|
| Titanium dioxide | 20.0 |
| Talc | 8.7 |
| Bentone 34 | 1.0 |
| Polyester resin | 24.5 |
| Styrene | 10.0 |
| n-Propyl alcohol | 5.8 | were roller mill ground to give a base paste which was catalyzed as follows:

| | Parts |
|---|---|
| Base paste | 93.3 |
| Catalyst paste (60% methyl ethyl ketone peroxide, 40% dimethyl phthalate) | 6.7 | for spray application the catalyzed paste was then reduced two parts by volume to one part solvent mixture comprising equal volume parts toluene and methyl ethyl ketone. The resulting basecoat composition is sprayed onto Lauan Plywood at a wet film thickness of about 1.0–1.5 mils and then is allowed to flash dry to tack-free state in one minute before an inked design is printed thereon with an ink consisting of

| | Parts |
|---|---|
| Inert base past (70 parts Blanc Fixe pigment roller mill ground into 30 parts of a polyester resin which is the esterification product of 35.0 parts propylene glycol and 25.14 parts mono-n-butyl ether of diethylene glycol with 39.76 parts maleic anhydride stabilized with 0.02 part of p-tertiary butyl catechol) | 90.0 |
| Black pigment paste (45 parts iron oxide roller mill ground into 50 parts same polyester as in inert paste) | 3.0 |
| Burnt sienna paste (50 parts burnt sienna roller mill ground into 55 parts same polyester as in the inert paste) | 2.0 |
| Vinyl toluene | 5.0 | and the wet inked design is spray coated with a top coating composition consisting of

| | Parts |
|---|---|
| Base paste (as in Example 1) | 20.80 |
| Polyester resin solution (as in Example 1) | 45.78 |
| Stabilizer solution (as in Example 1) | .02 |
| Styrene | 27.40 |
| Wax solution (as in Example 1) | 5.00 |
| Cobalt naphthenate 6% drier | 1.00 | which cures to a fairly hard, mar-resistant, semi-gloss finish in about two hours.

*Example 3*

This example is the same as Example 2 except that a gloss, wax-free topcoat, such as the Polylite Topcoat disclosed in Richhold Chemicals, Inc. Technical Bulletin SC–37, was used. This topcoat consists of:

| | Parts |
|---|---|
| Polylite 8703 polyester resin | 78.2 |
| Vinyl toluene | 15.7 |
| ESL–1372 flow control agent | 3.1 |
| 1% SF–69 (dimethyl silicone) in toluene | 1.6 |
| Lexinol AC (soya lecithin) | 0.4 |
| Cobalt naphthenate 6% drier | 1.0 |

The composite coating dries at room temperature to a hard, mar-resistant, glossy coating in six hours.

*Example 4*

A white basecoat is applied to wall board using a sprayable composition consisting of:

| | Parts |
|---|---|
| Base paste (as in Example 2 ground coat) | 99.5 |
| N,N-dimethyl p-toluidine reduced by volume four parts to one part solvent mixture comprising equal parts toluene and acetone | 0.5 | and then the coating is flash dried to tack-free state and spray coated with a topcoat consisting of a base paste made by dispersing

| | Parts |
|---|---|
| Titanium dioxide | 36.0 |
| Phthalocyanine green | 6.5 |
| Iron oxide black | 0.5 |
| Polyester resin solution (as in Example 2 ground coat) | 36.0 |
| Styrene | 21.0 | which is then let down as follows

| | |
|---|---|
| Base paste | 25.0 |
| Polyester resin solution (as in Example 2 ground coat) | 45.0 |
| Styrene | 21.0 |
| Wax solution (as in Example 1) | 5.0 |
| Peroxide catalyst paste (as in Example 1) | 4.0 | to give a sprayable composition having a viscosity of 32″ (#4 Ford Cup). The composite coating cures at room temperature in one hour to a mar-resistant, semi-gloss, green finish.

I claim:

1. A method of applying a protective and decorative coating to a surface comprising
    (1) applying a lower layer of a coating composition of an unsaturated polyester resin and vinyl monomer dissolved in a volatile solvent to said surface and drying said lower layer to a firm and tack-free state,
    (2) applying an upper layer of an unsaturated polyester resin and vinyl monomer coating composition upon said lower layer, one of said layers containing an activator and the other containing a peroxide catalyst and said lower and upper layers remaining separate and discrete from each other, said catalyst being initially absent from the layer containing activator and said activator being initially absent from the layer containing catalyst, and
    (3) curing the composite of said separate layers through the migration of part of the activator into the layer containing the catalyst and the migration of part of the catalyst into the layer containing the activator.

2. The method claimed in claim 1 wherein a colored design is printed on the lower layer after the lower layer has been dried and before the upper layer is applied.

3. The method claimed in claim 1 wherein the upper layer further contains a fraction of a percent of paraffin wax.

4. The method claimed in claim 1 wherein at least one of the layers is pigmented.

5. The method claimed in claim 1 wherein the activator is contained in the lower layer.

6. The method of claim 1 wherein the vinyl monomer is styrene.

References Cited by the Examiner

UNITED STATES PATENTS

| 2,198,939 | 4/1940 | Hempel | 117—75 |
| 2,786,716 | 3/1957 | Peeps | 117—104 X |
| 2,787,314 | 4/1957 | Anderson | 118—316 X |
| 2,813,751 | 11/1957 | Barrett | 299—76 |
| 2,817,619 | 12/1957 | Bickel et al. | 117—72 X |
| 2,921,867 | 1/1960 | Shaw | 117—161 |
| 2,927,867 | 3/1960 | Hings | 117—94 X |
| 2,950,997 | 8/1960 | Halacsy | 117—232 |
| 2,978,354 | 4/1961 | Lesser | 117—161 X |
| 3,051,585 | 8/1962 | Weinberg et al. | 117—161 X |
| 3,135,625 | 6/1964 | Ingrassia | 117—62.2 |

FOREIGN PATENTS

| 1,025,302 | 2/1958 | Germany. |

WILLIAM D. MARTIN, *Primary Examiner.*

RICHARD D. NEVIUS, *Examiner.*